US009471238B1

(12) United States Patent
Boden

(10) Patent No.: US 9,471,238 B1
(45) Date of Patent: Oct. 18, 2016

(54) LOW POWER STORAGE ARRAY WITH METADATA ACCESS

(71) Applicant: International Business Machines Corporation, Armonk, NY (US)

(72) Inventor: Ian Boden, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/058,299

(22) Filed: Mar. 2, 2016

Related U.S. Application Data

(63) Continuation of application No. 14/701,545, filed on May 1, 2015.

(51) Int. Cl.

| | |
|---|---|
| ***G06F 12/00*** | (2006.01) |
| ***G06F 3/06*** | (2006.01) |
| *G06F 11/14* | (2006.01) |

(52) U.S. Cl.
CPC ............. *G06F 3/0625* (2013.01); *G06F 3/065* (2013.01); *G06F 3/0689* (2013.01); *G06F 11/1456* (2013.01)

(58) Field of Classification Search
None
See application file for complete search history.

(56) References Cited

U.S. PATENT DOCUMENTS 6,996,688 B2 * 2/2006 Factor ................ G06F 11/1658 711/154
7,404,035 B2 7/2008 Anzai et al.
8,074,014 B2 12/2011 Narayanan et al.
8,090,924 B2 1/2012 Petrocelli
8,131,892 B2 3/2012 Kumasawa et al.
8,190,837 B2 5/2012 McLeod et al.
8,583,885 B1 11/2013 Natanzon
8,655,847 B2 * 2/2014 Kamra .............. G06F 17/30575 707/640
8,838,893 B1 9/2014 Randall et al.
2004/0181640 A1 * 9/2004 Factor ................ G06F 11/1658 711/162
2013/0254573 A1 9/2013 Kalman
2016/0048351 A1 * 2/2016 Kanteti ............... G06F 11/1451 714/19

OTHER PUBLICATIONS

Storer et al., "Pergamum: Replacing Tape with Energy Efficient, Reliable, Disk-Based Archival Storage", https://www.usenix.org/legacy/event/fast08/tech/full_papers/storer/storer_html/, University of California, Santa Cruz, Network Appliance, Accessed on Apr. 17, 2015, pp. 1-20.

IBM: List of IBM Patents or Patent Applications Treated As Related (Appendix P), Mar. 28, 2016, 2 pages.

Pending U.S. Appl. No. 14/701,545, filed May 1, 2015, entitled: "Low Power Storage Array With Metadata Access", 21 pages.

* cited by examiner

*Primary Examiner* — Brian Peugh
(74) *Attorney, Agent, or Firm* — L. Jeffrey Kelly; Randall J. Bluestone

(57) ABSTRACT

A method for low power storage array with metadata access includes sequentially writing data to a currently active disk drive in a storage array and storing metadata relating to the writes in a preallocated portion of the currently active disk drive, determining when the currently active disk drive is nearing full capacity, activating a next disk drive and cloning the stored metadata from the preallocated portion of the currently active disk drive to a preallocated portion of the next disk drive. When the currently active disk drive is full, sequentially writing data to the next disk drive.

1 Claim, 5 Drawing Sheets

LOW POWER STORAGE ARRAY WITH METADATA ACCESS

BACKGROUND

The present invention generally relates to low power storage arrays, and more specifically, to low power storage arrays with metadata access.

Cold storage devices are devices that use the least possible amount of power to store data that is rarely read. This may be typically done by spinning down inactive disks or by using media that does not need to be kept spinning (using DVDs for example).

SUMMARY

According to a first aspect of the present invention there is provided a method for low power storage array with metadata access, comprising: sequentially writing data to a currently active disk drive in a storage array; storing metadata relating to the writes in a preallocated portion of the currently active disk drive; determining when the currently active disk drive is nearing full capacity; activating a next disk drive and cloning the stored metadata from the preallocated portion of the currently active disk drive to a preallocated portion of the next disk drive; and, when the currently active disk drive is full, sequentially writing data to the next disk drive.

According to a second aspect of the present invention there is provided a system for low power storage array with metadata access, comprising: a sequential write component for sequentially writing data to a currently active disk drive in a storage array; a metadata component for storing metadata relating to the writes in a preallocated portion of the currently active disk drive; a near capacity determining component for determining when the currently active disk drive is nearing full capacity; a disk activator component for activating a next disk drive and a metadata cloning component for cloning the stored metadata from the preallocated portion of the currently active disk drive to a preallocated portion of the next disk drive; and, when the currently active disk drive is full, the sequential write component sequentially writing data to the next disk drive.

According to a third aspect of the present invention there is provided a computer program product for low power storage array with metadata access, the computer program product comprising a computer readable storage medium having program instructions embodied therewith, the program instructions executable by a processor to cause the processor to: sequentially write data to a currently active disk drive in a storage array; store metadata relating to the writes in a preallocated portion of the currently active disk drive; determine when the currently active disk drive is nearing full capacity; activate a next disk drive and cloning the stored metadata from the preallocated portion of the currently active disk drive to a preallocated portion of the next disk drive; and, when the currently active disk drive is full, sequentially write data to the next disk drive.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

As previously described, cold storage devices are devices that use the least possible amount of power to store data that is rarely read. This may be typically done by spinning down inactive disks or by using media that does not need to be kept spinning (using DVDs for example). However, determining when to spin down disks and ensuring that they can be spun down may be a challenging task, mainly because systems may frequently store metadata along with host data. The metadata may contain important information such as the configuration of the system. Writing metadata to a spinning disk while waiting for a disk to spin up may negatively affect the write performance of the system.

Embodiments of the present invention generally relates to low power storage arrays, and more specifically, to low power storage arrays with metadata access. The following described exemplary embodiments provide a method, system and program product for a storage array using proactive system metadata movement.

The described storage array may be particularly useful in low power cold storage devices in which only the minimum required storage array elements are powered. For example, inactive disk drives may be spun down when not needed.

The described method, system and program product may be used in many forms of storage systems in which multiple storage devices are provided. Most storage devices may need some time to start up and be activated. In the case of disk storage, the disks may need to be spun up.

In the described method, system and program product a series of sequentially written disk drives may be provided. Writes may also be made to a series of mirrored disk drives to provide redundancy. As sequential writes enable the write rate to be monitored, metadata relating to the writes may be copied between a currently active disk drive and a next disk drive which may be activated to take over the sequential writes from the currently active disk drive.

Figure 1:
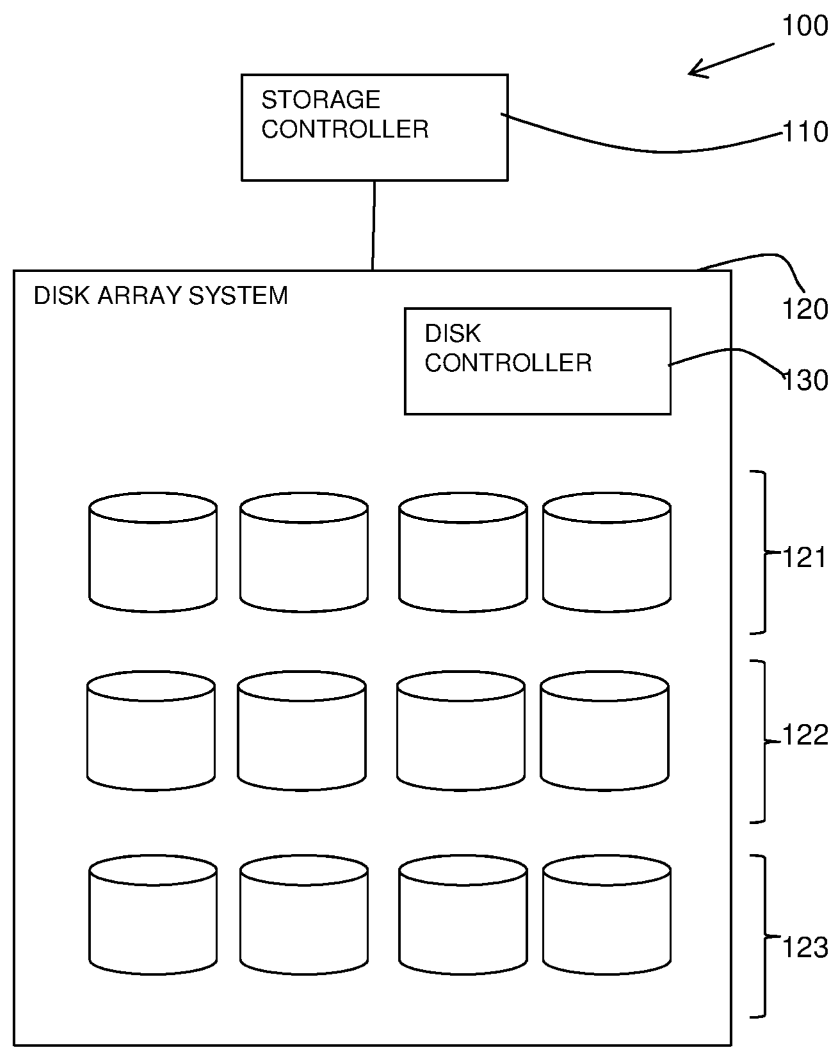
FIG. 1 is a schematic diagram of an example embodiment of a storage system in which the present invention may be implemented.

Referring to FIG. 1, an example storage system 100 is shown, according to an embodiment of the present disclosure. The storage system 100 may include a storage controller or disk array controller 110 and a disk array system 120. The storage controller 110 may be provided via a network such as a storage area network (SAN). The disk array system 120 may include a disk controller 130 for disk spinning management and each array of disks 121, 122, 123 may be referenced by a logical unit number (LUN).

The described method, system and program product may be used in a wide range of storage system configurations in which sequential writes are make along the disks in the order they are received. A mapping may be provided associated with the writes to reference a logical block address (LBA) the write is for.

Figure 2:
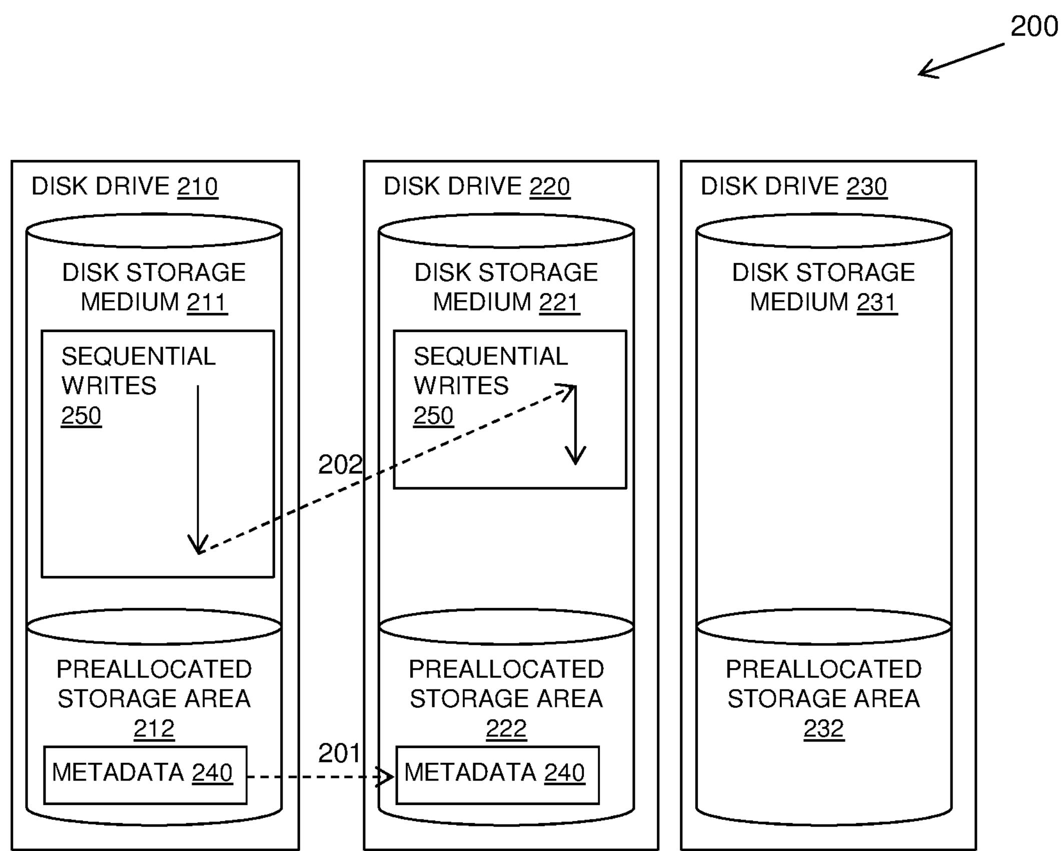
FIG. 2 is a schematic diagram illustrating an example method in accordance with the present invention.

Referring to FIG. 2, a schematic diagram 200 shows a series of physical storage disk drives 210, 220, 230 each of which is written to sequentially, according to an embodiment of the present disclosure. Each disk storage medium 211, 221, 231 of the disk drives 210, 220, 230 may have a preallocated storage area 212, 222, 232 for metadata 240 relating to the writes.

A current disk drive 210 may be active and being written to with sequential write data 250 being written sequentially to the disk storage medium 211 and associated metadata 240 being written to the preallocated storage area 212 of the disk storage medium 211.

As the current disk drive 210 reaches near capacity for write data, a next disk drive 220 may become active, for example, by being spun up, and the metadata 240 may be copied at 201 from the current disk drive 210 to the next disk drive 220 to a preallocated storage area 222 of the disk storage medium 221 of the next disk drive 220. Subsequent writes may then be written at 202 to the next disk drive 220 and the associated metadata 240 is available on the next disk drive 220.

By using a journaled LUN in which writes may be written along the disk storage medium in the order they are received rather than based on the LBA the write was for, it may be possible to predict where the next write will need to go. Disk drives that have not yet been written to can be kept inactive. As it may be known how much data needs to be written, the disk drives can be activated in advance.

A similar system may be used for the metadata. A block of memory may be preallocated from each disk drive and when a next disk drive is spun up, the metadata may be copied from the currently active disk drive to the disk drive that has just been spun up. When the writes start falling on to the newly spun up disk drive, the metadata may be already there and the previous disk drive can be spun-down. The metadata must fit within the preallocated space on the disk drive. The metadata does not have to be constant and may be updated, but must have a known maximum size to ensure it fits in the preallocated space.

By not using any specific hardware any storage array may behave in this manner. For example, the LUNs could be any type, rather than having to use something like DVDs with custom hardware to swap them in and out.

It may be possible to use the described storage system as a cold storage system but then if storage demand increases a non-disruptive change would allow the storage system to be used to hold production data.

For cases where the cold storage is in the form of an archive, in the event it may be required to restore data after an initial period of spinning up the disk drives, then the storage device may provide the same performance as an ordinary storage array.

The storage system may also be partitioned so that a section of it acts as a cold storage system while the rest acted as a normal storage system.

Figure 3:
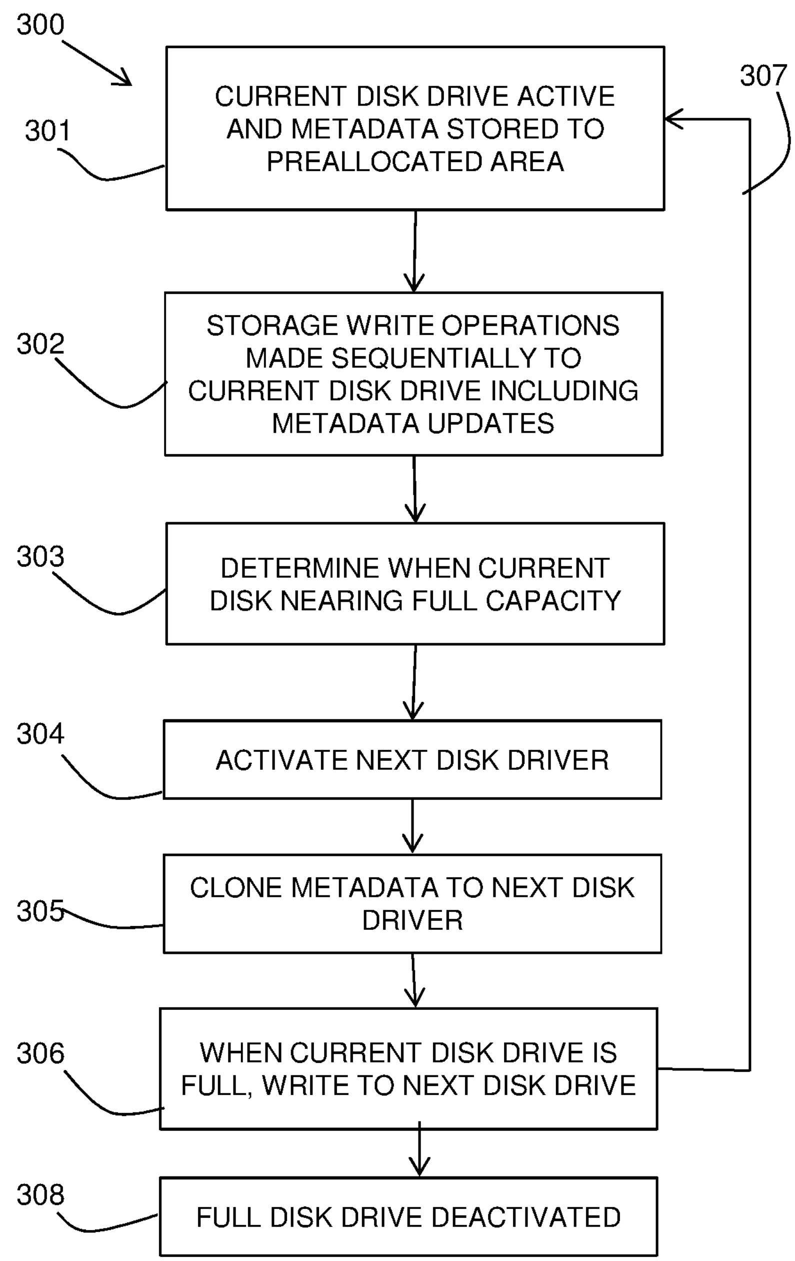
FIG. 3 is a flow diagram of an example method in accordance with the present invention.

Referring to FIG. 3, a flow diagram 300 shows an embodiment of the described method carried out by a controller of a storage system.

A current disk drive may be active at 301, for example, by being powered and spun up. A preallocated area of the disk storage medium of the disk drive may have metadata for the storage writes stored to it. The metadata may include information on the configuration of the storage system.

Storage write operations may be made at 302 sequentially to a current disk drive including metadata updates.

It is determined at 303 when the current disk drive is nearing full capacity of storage writes. This may be determined by user defined criteria such as the size of the write cache in the storage system, the average data-rate of writing, and the time required to activate the next disk drive, the time required to copy the metadata, etc.

A next disk drive may be activated or spun up at 304 in preparation for taking over from the current disk drive. The metadata stored in the preallocated area of the current disk drive may be cloned at 305 to the preallocated area of the next disk drive. This may be carried out in the background to prepare the next disk drive.

When the current disk drive is full, the write operations may be written at 306 to the next disk drive which then becomes the current disk drive and the method may loop at 307.

The disk drive that is full may then be deactivated or spun down at 308.

Each disk drive has a predefined section preallocated to hold the metadata for the system, for example, the first or last 50 megabytes may be kept purely for system metadata. The disk drives may be arranged into a sequential array, for example assuming disk drives of 1 terabyte capacity using a block size of 512 bytes. After the metadata space has been reserved, LBAs 0x0-0x1FFFFF fit onto the first disk drive, LBAs 0x200000-0x3FFFFF on the second, and so on.

The size of the preallocated area of a disk drive for metadata, may be determined for the required system. In one example, a preallocated area in the order of 256 megabytes may be reserved with only half this amount being used in practice.

A single volume may be presented from the array, as writes are received the real requested LBA may be mapped to the next available LBA in the array. This may require a mapping to be stored in-line with the data or with the system metadata. This may indicate that regardless of where the host writes are for, they may typically fill up the first disk drive first. It should be noted that several implementations may be used for in-line data storing. In some embodiments, the system metadata may be stored on the first disk drive when none of the other drives are active.

It may then be determined when the first drive gets close to full capacity. This may be user definable, based on the size of the write cache in the system, or calculated based on the average data-rate and the time required to spin up a disk drive such that it would be ready to receive writes without performance degradation. The second disk drive may be spun up and after spinning up, the system metadata may be cloned from the first drive to the second as a background task. As soon as the first disk drive is full the writes may continue smoothly onto the second disk drive. Once the first disk drive is full and the metadata has been cloned to the second disk drive, the first disk drive can be spun down and only needs to be spun up if a host read is requested for data on it.

Figure 4:
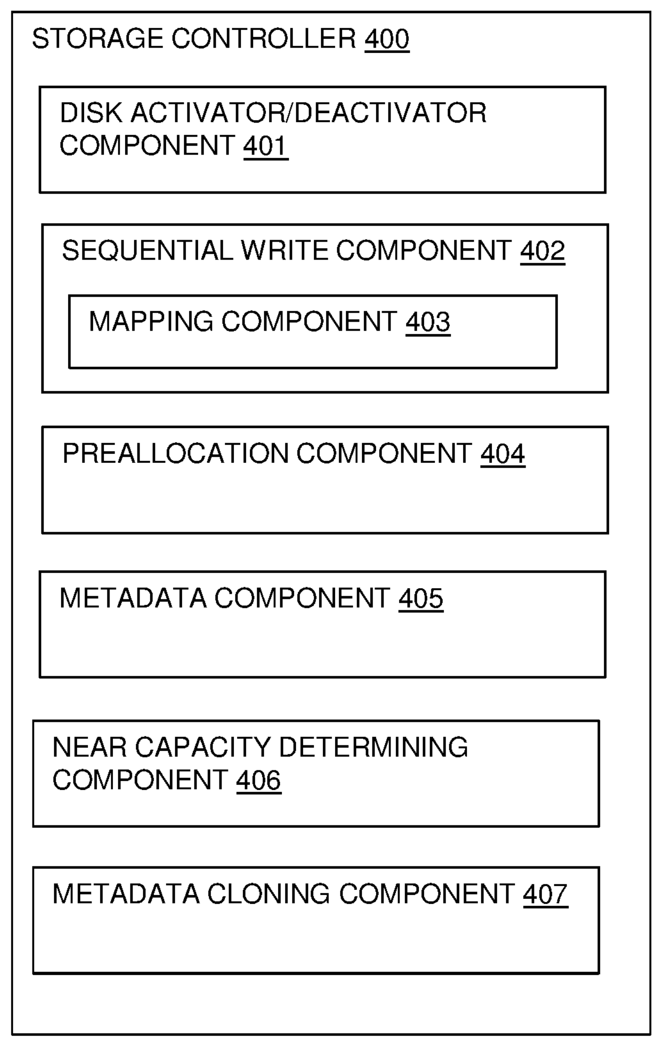
FIG. 4 is a block diagram of an example system in accordance with the present invention.

Referring to FIG. 4, a block diagram shows a storage controller 400 providing the described functionality, according to an embodiment of the present disclosure. The location and form of the storage controller 400 may vary depending on the form of storage system in which it is operating.

The storage controller 400 may include conventional components such as a disk drive activator/deactivator component 401 for instructing a disk controller for spinning up and spinning down disk drives in a storage system as required. A sequential write component 402 may write data to the disk drives of the storage system in a sequential manner and may include a mapping component 403 to map sequential writes to LBAs.

A preallocation component 404 may preallocate a portion of each disk drive for metadata. A metadata component 405 may write metadata and metadata updates to the preallocated portion.

A near capacity determining component 406 may be provided for determining when a current disk drive is near full capacity. A metadata cloning component 407 may clone metadata stored at a preallocated portion of a current disk drive to a newly activated disk drive.

The described method, system and program product may turn a random write stream into a sequential write stream so that it is known which disk drive is going to be written to next. The described method, system and program product may move the metadata so that disk drives do not need to be kept spinning in a storage system.

The described method, system and program product may use journaling to produce a low power system. It is not on having the high performance SSDs available as it assumes that the sequential performance of the spinning magnetic drives may be sufficient for an archive system.

Figure 5:
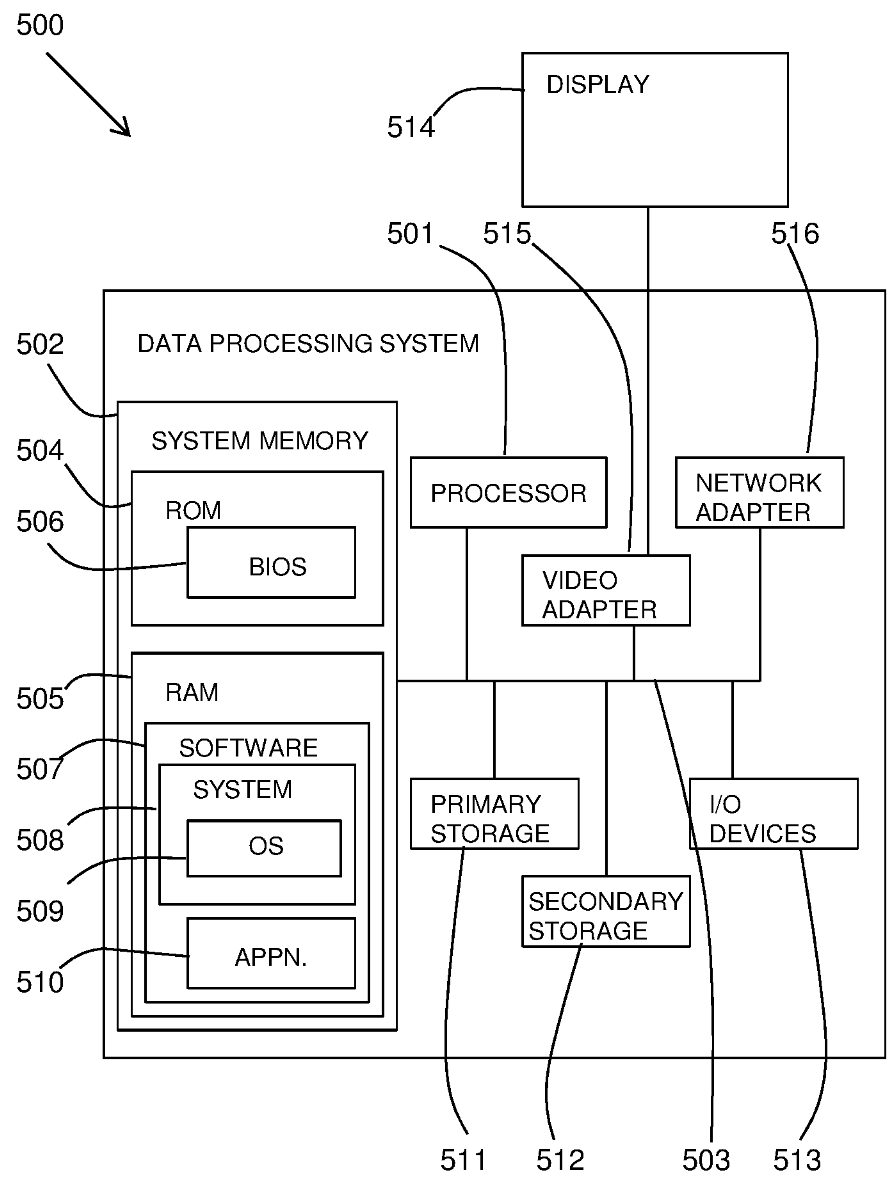
FIG. 5 is a block diagram of an embodiment of a computer system in which the present invention may be implemented.

Referring to FIG. 5, an exemplary system for implementing aspects of the present invention is shown. The system may include a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508 such as operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for low power storage array with metadata access, the method comprising:

sequentially writing data to a disk storage medium of a currently active disk drive in a storage array;

mapping sequential writes to logical business addresses in the storage array;

storing metadata associated to the sequentially written data in a preallocated portion of the disk storage medium in the currently active disk drive, wherein the metadata comprises information corresponding to a configuration of the storage array and, wherein a maximum size of the metadata is known such that the metadata does not exceed a size of the preallocated portion of the disk storage medium;

updating the metadata in the preallocated portion of the disk storage medium in the currently active disk drive;

activating, in response to the current disk drive being near full capacity, a next disk drive, wherein the current disk drive being near full capacity is determined based on a user-defined criteria comprising one or more of an overall size of a write cache in the storage array, an average data-rate of writing, a time required to activate a next disk drive, or a time required to copy the metadata;

cloning, as a background process, the metadata from the preallocated portion of the disk storage medium in the currently active disk drive to a preallocated portion of a disk storage medium in the next disk drive;

continuing sequentially writing data to the disk storage medium in the next disk drive, in response to the current disk drive being full; and deactivating the current disk drive.

* * * * *